(12) United States Patent
Racz et al.

(10) Patent No.: US 12,187,558 B2
(45) Date of Patent: Jan. 7, 2025

(54) LOADING HEAD ARRANGEMENT INCLUDING SEALING AT THE LOADING OPENING OF A RAILWAY CAR

(71) Applicant: Zeppelin Systems GmbH, Friedrichshafen (DE)

(72) Inventors: Gregory Racz, Katy, TX (US); Johnny Quinonez, Cypress, TX (US); John Stuart, Magnolia, TX (US)

(73) Assignee: ZEPPELIN SYSTEMS GMBH, Friedrichshafen (DE)

( * ) Notice: Subject to any disclaimer, the term of this patent is extended or adjusted under 35 U.S.C. 154(b) by 114 days.

(21) Appl. No.: 18/182,555

(22) Filed: Mar. 13, 2023

(65) Prior Publication Data

US 2024/0308792 A1 Sep. 19, 2024

(51) Int. Cl.
*B65G 67/20* (2006.01)
(52) U.S. Cl.
CPC ................ *B65G 67/20* (2013.01)

(58) Field of Classification Search
CPC .. B65G 2814/03; B65G 67/606; B65G 53/00; B65G 67/06; B65G 67/02; B63B 27/28
See application file for complete search history.

(56) References Cited

U.S. PATENT DOCUMENTS 9,505,568 B1 * 11/2016 Parris ............... B65G 67/06
2023/0020035 A1 * 1/2023 Otake ............... B63B 19/18

* cited by examiner

*Primary Examiner* — Jason K Niesz
(74) *Attorney, Agent, or Firm* — FISHERBROYLES, LLP; Roger L. Browdy; Ronni S. Jillions

(57) ABSTRACT

The invention relates to a loading head arrangement (1, 5, 15), including a telescopic loading head (5) for loading pourable bulk materials (6) onto railway cars (20), wherein the loading head (5) sealingly rests on a filling opening (11) arranged at the railway car (20) by way of at least one seal (25, 26), and wherein the seal (25, 26) is designed as a double seal and has a first upper sealing ring (25), which rests on a horizontal flange (11a) of the filling opening (11), and a second lower sealing ring (26), which sealingly conforms to a vertical flange (11b) of the filling opening (11).

16 Claims, 4 Drawing Sheets

LOADING HEAD ARRANGEMENT INCLUDING SEALING AT THE LOADING OPENING OF A RAILWAY CAR

The invention relates to a loading head arrangement including sealing at the loading opening of a railway car according to the preamble of claim 1. Such a loading head arrangement became known from U.S. Pat. No. 10,577,195 B2 attributable to the same applicant. The disclosure of this US patent shall be encompassed in its entirety by the disclosure of the present invention.

The known loading head arrangement has a loading head, which is designed for loading pourable bulk materials onto railway cars.

The loading head shown in U.S. Pat. No. 10,577,195 B2, however, only provides for simple sealing between the loading head and the filling opening at the railway car. This resulted in the drawback that bulk material inadvertently found its way from the inadequately sealed regions between the loading head and the filling opening of the railway car into the surrounding area, which was associated with undesirable soiling of the surrounding area.

It is the object of the invention to refine a loading head arrangement of the type described at the outset in such a way that inadvertent soiling of the surrounding area during loading of the railway car is avoided.

It is an advantageous feature of invention that the portion of the loading head sitting directly on the loading opening of the railway car is sealed by way of two seals acting in opposite directions.

It is preferred when the seal, designed as a double seal, has a first upper sealing ring, which rests on a horizontal flange of the filling opening of the railway car, and a second lower sealing ring, which sealingly conforms to a vertical flange of the filling opening of the railway car.

In the process, a method is preferred which, in a first method step, lowers the loading head suspended on a lifting gear until the lower sealing ring, at the loading head, moves into the filling opening of the railway car, and sealingly conforms to a vertical flange of the filling opening there, and becomes centered there. In a second method step, the loading head is lowered further by way of the lifting gear until an upper second sealing ring, at the loading head, rests on a horizontal flange of the filling opening of the railway car and provides sealing there.

As a result, initially the lower sealing ring ensures the centering in the filling opening of the railway car, while at the same time sealing is provided at the vertical flange of the filling opening of the railway car. When the lifting gear is lowered further, the lower sealing ring slides downwardly along the vertical flange of the filling opening, and more particularly until the second upper sealing ring rests on the upper horizontal flange of the filling opening of the railway car, and likewise provides sealing there.

This creates a double seal that, with the lower sealing ring thereof, ensures centering and sealing at the vertical flange of the filling opening, while the upper seal achieves the sealing at the upper horizontal flange of the filling opening, thereby ensuring complete sealing of the loading head in two directions perpendicular to one another in the region of the filling opening of the railway car.

Such a double seal is also used analogously with a ventilation hood. In some applications of the invention, such a ventilation hood is part of the loading arrangement according to the invention and is used to ventilate the interior space of the railway car when bulk material is poured into the car via the other filling opening.

According to the prior art, the use of such a ventilation arrangement likewise resulted in undesirable egress of bulk material due to inadequate seals.

According to the invention, a so-called ventilation hood is provided for this ventilation process, which is equipped with the same double seal as the double seal of the loading head and also takes over the same sealing function. Accordingly, the above-described first method, which described the operation of the telescopic loading head, is now being modified into a second method, which describes the operation of the ventilation hood for ventilating the railway car.

It is provided that, in a first method step, the ventilation hood, on a ventilation opening situated at the railway car, is lowered by way of lifting gear until a lower sealing ring, at the ventilation hood, moves into the filling opening and sealingly conforms to a vertical flange of the ventilation opening, and becomes centered there. The lifting gear is lowered further in the process, and more particularly until an upper second sealing ring, at the outer circumference of the ventilation hood, rests on a horizontal flange of the ventilation opening at the railway car, and likewise provides sealing there.

As a result, it becomes evident that the double seal according to the invention is not only suitable for the two-fold sealing of the loading head in the filling opening of a railway car, but additionally for the sealing of a ventilation hood, which can likewise be placed with the double seal according to the invention onto a ventilation opening of the railway car, where it provides for ventilation of the railway car filled with the pourable bulk material, without bulk material entering the surrounding area.

According to a preferred feature of the invention, it is provided that the upper sealing ring resting on the horizontal flange is held in a downwardly open groove in a horizontal flange ring, and that the flange ring is joined, preferably by way of a weld joint, to the side wall of the loading head or the ventilation hood all-around. The sealing ring preferably has a rounded, approximately convex sealing surface. This allows lateral play for the loading head or the ventilation hood when moving into the filling opening or the ventilation opening, without the sealing action being lost.

It is furthermore preferred when the lower sealing ring resting against the vertical flange of the filling opening or of the ventilation opening is attached by way of a screw attachment to the same flange ring to which the upper sealing ring is also attached.

It is preferred when the lower sealing ring has a radially outwardly directed, wedge-shaped sealing surface, so that the wedge-shaped sealing surface forms a conical insertion chamfer when the loading head or the ventilation hood moves into the insertion opening or ventilation opening at the railway car. In addition to the actual sealing function, the lower sealing ring thus also carries out a centering function.

It is particularly advantageous with respect to the two described methods and the device when the upper sealing ring is arranged at a vertical distance above the lower, wedge-shaped sealing ring since this ensures that the wedge-shaped lower sealing ring first becomes centered in the insertion opening or the ventilation opening at the railway car when the loading head or the ventilation hood is being moved in, and that, as the lifting gear is lowered further, the upper sealing ring only follows once this centering has taken place and conforms, on the upper side of the insertion opening or of the ventilation opening, to an upper horizontal flange situated there with radial play.

The subject matter of the present invention can be derived not only from the subject matter of the individual claims, but also from the combination of the individual claims with one another.

All information and features disclosed in the documents, including the abstract, and in particular the spatial configuration shown in the drawings, could be claimed as being essential to the invention, provided these are novel over the prior art, either individually or in combination. The use of the terms "essential" or "according to the invention" or "essential to the invention" is subjective and does not imply that the features described in this way necessarily have to be an integral part of one or more claims.

The invention will be described in greater detail hereafter based on drawings showing only one way to carry out the invention. Additional features that are essential to the invention and advantages of the invention can be derived from the drawings and their description.

Figure 1:
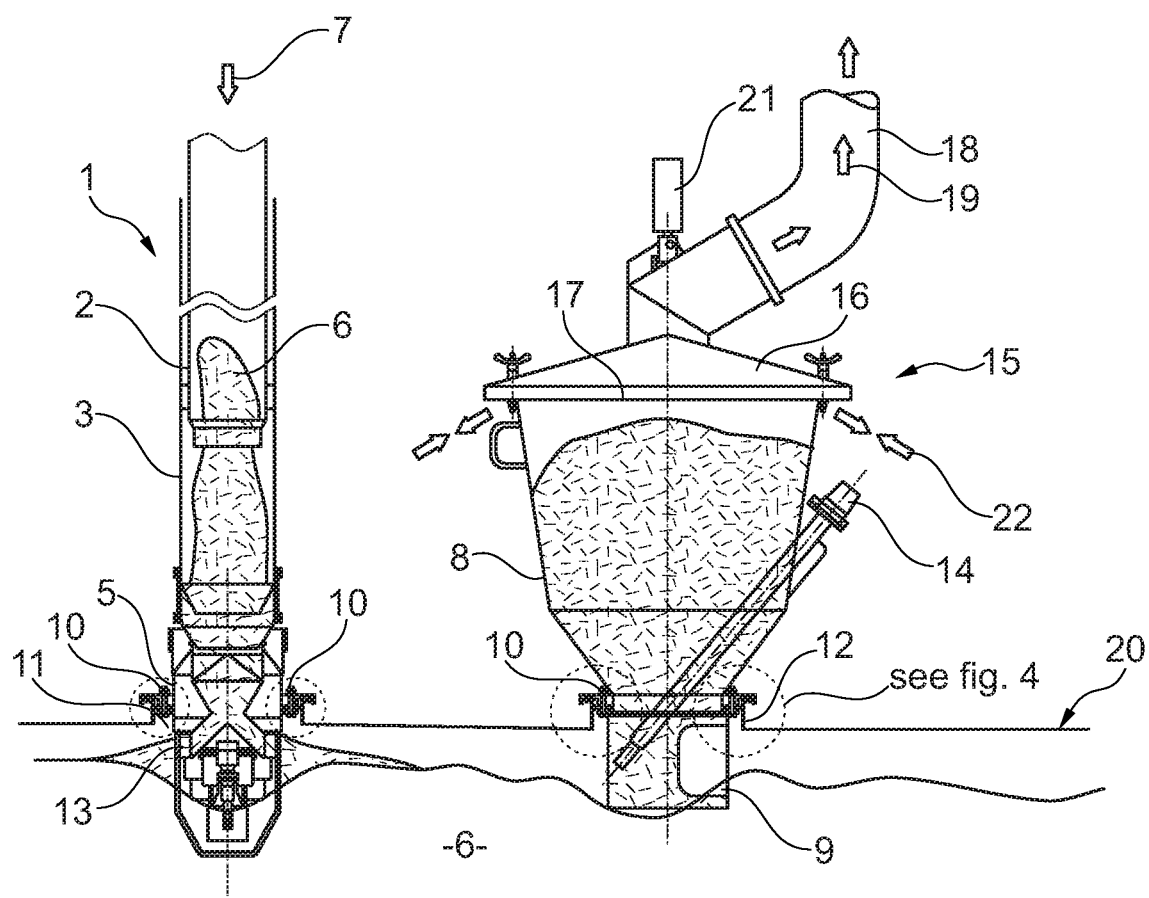
FIG. 1 shows a schematic representation of a loading head arrangement, having a telescopic loading head and a ventilation hood.

In the shown exemplary embodiment, the loading head arrangement 1 shown only schematically in FIG. 1 has a loading head 5, which is designed as a telescopic loading head. An outer tube 2 accommodates an inner tube 3 in a displaceable manner, and the entire telescopic arrangement 4 formed thereby is suspended on lifting gear, which is not shown in greater detail. The two tubes 2, 3 are sealed with respect to one another, and bulk material 6 will flow, as a result of gravity, into the loading head 5 arranged at the lower tube 2 and will flow there via lateral distribution nozzles 13 into the interior space of a railway car 20. The loading head 5, which is sealed by way of the double seal 10 according to the invention, is placed on the circumference and in the interior space of the filling opening 11 so as to achieve absolutely tight sealing with respect to the atmosphere.

This reliably prevents material that is being added from finding its way out of the filling opening 11, past the loading head 5, into the surrounding area.

In general, such a telescopic arrangement 4 including a loading head 5 would suffice for a simple embodiment of a loading head arrangement 1. According to a refinement of the invention, however, an additional ventilation device is also present, which is part of the loading head arrangement 1 and ensures that pourable bulk material also cannot find its way to the outside from the further openings at the railway car 20. For this purpose, at least one ventilation opening is arranged on the upper side of the railway car 20, having the same cross-section and the same design as the aforementioned filling opening 11 for the loading head 5. In this way, the ventilation hood 15 is moved incrementally by way of a lifting gear, which engages at the load receiving device 21, into the ventilation opening 12 until the double seal 10 performs its function, and both vertical sealing and horizontal sealing are provided.

The ventilation hood 15 has a receptacle 8, which is closed by a lid 16, and lid vents 22 can be provided in the region between the receptacle 8 and the lid 16. A screen fabric 17, which prevents bulk material from flowing out of the lid vents 22 to the outside, are arranged in the interior space of the receptacle 8. Furthermore, a sample removal point 14 is provided, and the cylindrical flange of the ventilation hood 15 extending into the interior space of the railway car 20 includes lateral ventilation openings 9, via which overpressure arising in the interior space of the railway car flows through the receptacle 8, in the direction of the arrow 19, into a ventilation tube 18.

Figure 2:
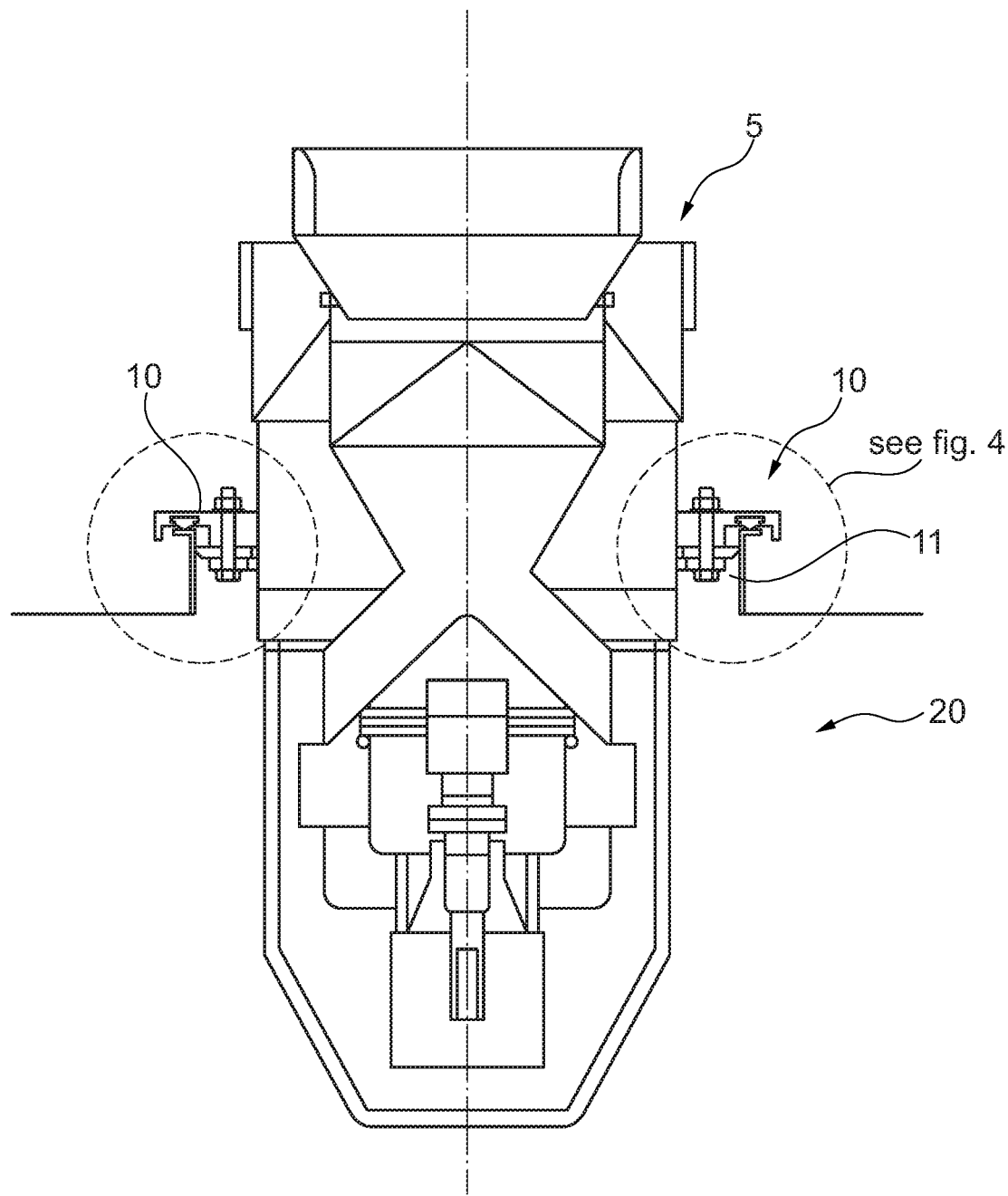
FIG. 2 shows a schematic sectional view, rotated by 90°, of the sealed arrangement of the loading head in the insertion opening of the railway car.

FIG. 2, in an increased scale and a schematic illustration, shows the loading head 5 extending through the filling opening 11 in the railway car 20, in the sealed state of the double seal 10.

Figure 3:
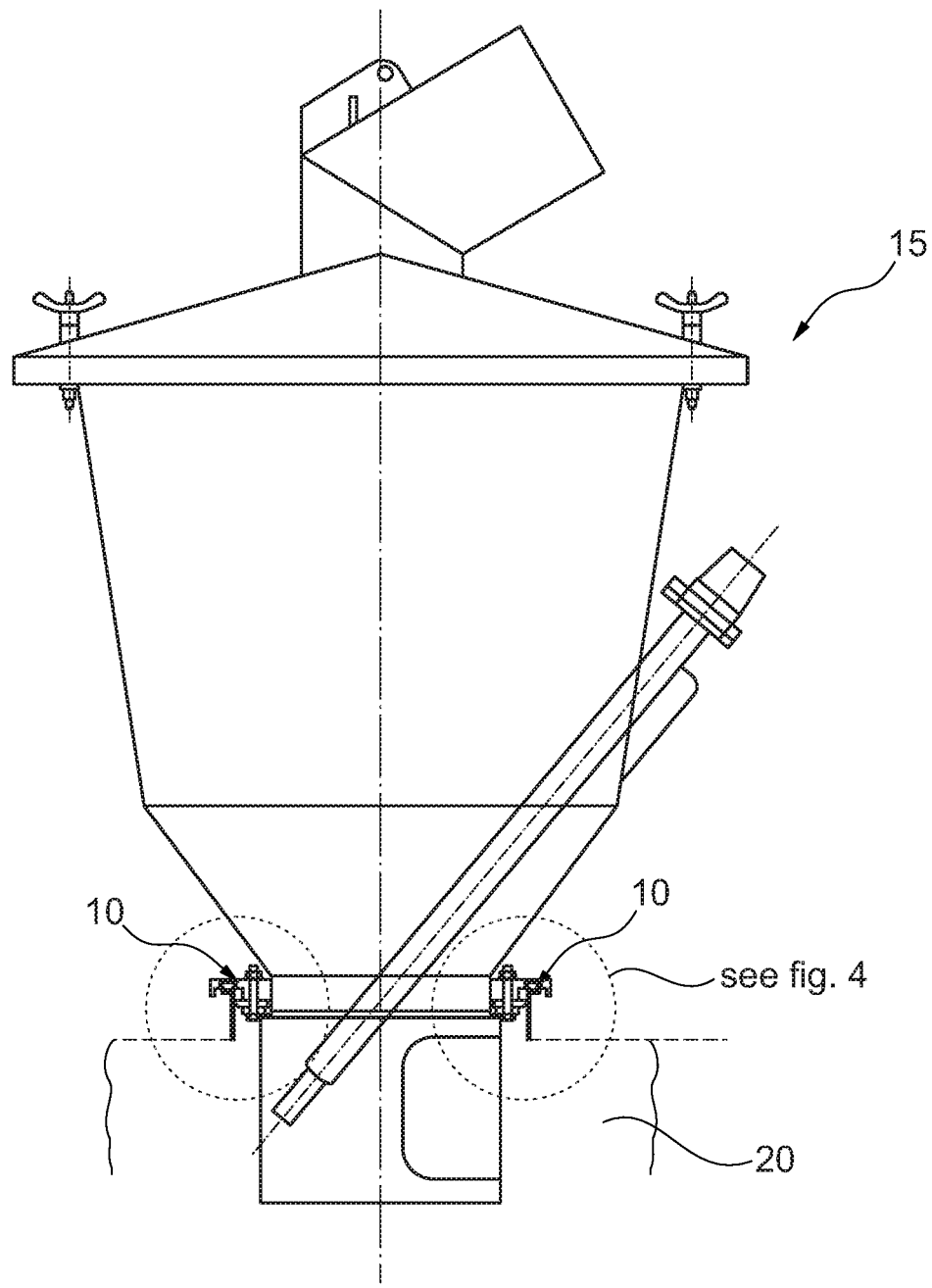
FIG. 3 shows the schematic representation of the sealed arrangement of the ventilation hood on a ventilation opening of the railway car.

FIG. 3 shows the representation of FIG. 1 with respect to the ventilation hood 15 in an enlarged scale, as well as the double seal 10, which fulfills the same function as the double seal 10 at the loading head 5.

Figure 4:
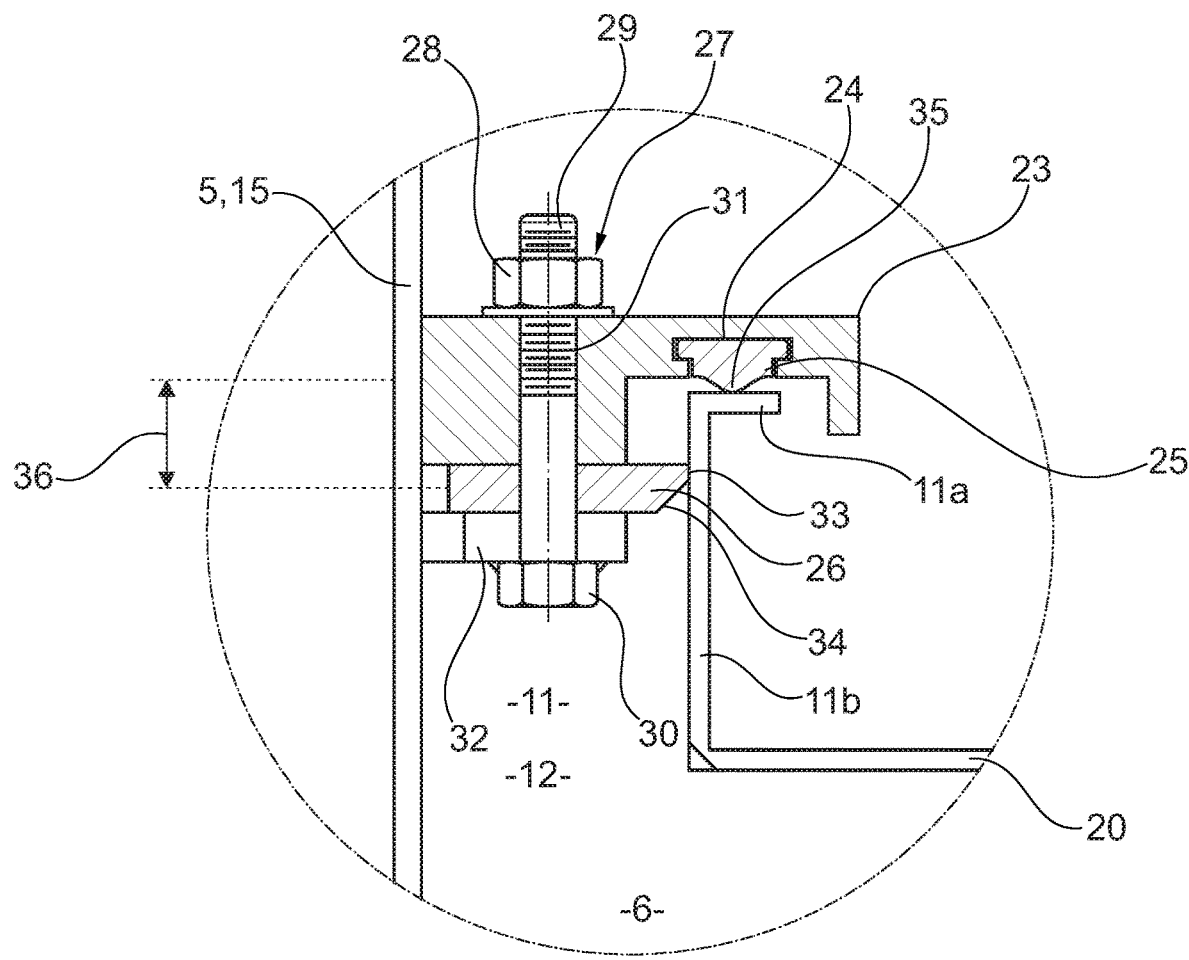
FIG. 4 shows an enlarged representation of the sealing arrangement in a sectional view of a double seal, such as is used for sealing the loading head and the ventilation hood.

FIG. 4 thus shows the function of the double seal 10 on both parts of the loading head arrangement, namely at the loading head 5 and at the ventilation hood 15.

It is apparent that a circumferential flange ring 23, which is preferably welded on, is arranged at a vertical side wall of the loading head or of the ventilation hood 15. A circumferential groove 24 is integrally formed on the underside of the horizontal flange ring 23, in which a first upper sealing ring 25 is accommodated, in a secured manner to prevent the sealing ring from falling out, which is preferably made of an elastomeric plastic material. The flange ring forms a convex or rounded sealing surface 35, which on a horizontal flange 11a conforms to the circumference around the filling opening 11 of the railway car 20. A further sealing ring 26 is attached to the flange ring 23 at a vertical distance 36 below the upper sealing ring 25. The attachment is carried out with the aid of tension screws 27 arranged spaced apart from one another, wherein each tension screw 27 forms a screw bolt 29 including a screw head 30 integrally formed thereon and is attached to the flange ring 23 with the aid of a nut.

An annular flange 32, through the borehole of which the screw bolt 29 extends, is arranged at the screw head 30, wherein this bore is coaxial with the bore 31 in the flange ring 23. The second sealing ring 26 is held in this way, which comprises a radially outwardly directed wedge-shaped sealing surface 34, which sealingly conforms with a portion, namely the sealing surface 33, to the vertical flange 11b of the filling opening 11.

In this way, two sealing rings 25, 26 that act at an angle of 90° with respect to one another are present, wherein the wedge shape of the sealing surface 34 of the lower sealing ring 26 ensures that, when the loading head 5 or the ventilation hood 15 moves into the openings 11, 12, initially a centering takes place at the vertical leg 11b of the filling opening 11 or of the ventilation opening 12, and only thereafter, when this centering is present, does the upper sealing ring 25 follow and conform to the upper horizontal flange 11a of the filling opening 11 or of the ventilation opening 12.

This ensures reliable sealing of a loading head 5 and/or of a ventilation hood 15 at a railway car 20, without the risk of pourable bulk material inadvertently finding its way to the surrounding area.

DRAWING LEGEND 1 loading head arrangement
2 outer tubes 3 inner tubes
4 telescopic arrangement
loading head
6 bulk material
7 direction of arrow
8 receptacle
9 ventilation opening
10 double seal
11 filling opening (of 1)
   11a flange
   11b flange
12 ventilation opening (for 15)
13 distribution nozzle
14 sample removal point
15 ventilation hood
16 lid
17 screen fabric
18 ventilation tube
19 direction of arrow
20 railway car
21 load receiving device
22 lid vent
23 flange ring
24 groove
25 sealing ring (horizontal)
26 sealing ring (vertical)
27 tension screw
28 nut
29 screw bolt
30 screw head
31 borehole
32 annular flange
33 sealing surface (of 26)
34 sealing surface (of 26)
35 sealing surface (of 25)
36 vertical distance

The invention claimed is:

1. A loading head arrangement, including a telescopic loading head for loading pourable bulk materials onto railway cars, the loading head sealingly resting on a filling opening arranged at the railway car by way of at least one seal, characterized in that the seal is designed as a double seal and has a first upper sealing ring, which rests on a horizontal flange of the filling opening, and a second lower sealing ring, which sealingly conforms to a vertical flange of the filling opening.

2. The loading head arrangement according to claim 1, characterized in that the upper sealing ring arranged at the horizontal flange of the ventilation opening is arranged at a vertical distance above the lower sealing ring conforming to the vertical flange.

3. The loading head arrangement according to claim 1, characterized in that the upper sealing ring resting on the horizontal flange is held in a downwardly open groove in a flange ring, and that the flange ring is joined to the side wall of the loading head or of the ventilation hood.

4. The loading head arrangement according to claim 3, characterized in that the upper sealing ring comprises a rounded sealing surface.

5. The loading head arrangement according to claim 1, characterized in that the lower sealing ring resting against the vertical flange is attached to the bottom side of a flange ring attached to the loading head or the ventilation hood.

6. The loading head arrangement according to claim 5, characterized in that the lower sealing ring comprises a wedge-shaped sealing surface.

7. The loading head arrangement according to claim 6, characterized in that the lower sealing ring is attached to the flange ring by means of a screw connection.

8. A loading head arrangement, including a ventilation hood for ventilating railway cars loaded with pourable bulk materials, the ventilation hood sealingly resting on a ventilation opening arranged at the railway car by way of at least one seal, characterized in that the seal is designed as a double seal and has a first upper sealing ring, which rests on a horizontal flange of the ventilation opening, and a second lower sealing ring, which sealingly conforms to a vertical flange of the ventilation opening.

9. The loading head arrangement according to claim 8, characterized in that the upper sealing ring arranged at the horizontal flange of the ventilation opening is arranged at a vertical distance above the lower sealing ring conforming to the vertical flange.

10. The loading head arrangement according to claim 8, characterized in that the upper sealing ring resting on the horizontal flange is held in a downwardly open groove in a flange ring, and that the flange ring is joined to the side wall of the loading head or of the ventilation hood.

11. The loading head arrangement according to claim 10, characterized in that the upper sealing ring comprises a rounded sealing surface.

12. The loading head arrangement according to claim 8, characterized in that the lower sealing ring resting against the vertical flange is attached to the bottom side of a flange ring attached to the loading head or the ventilation hood.

13. The loading head arrangement according to claim 12, characterized in that the lower sealing ring comprises a wedge-shaped sealing surface.

14. The loading head arrangement according to claim 13, characterized in that the lower sealing ring is attached to the flange ring by means of a screw connection.

15. A method for operating a loading head arrangement, including a telescopic loading head for loading pourable bulk materials onto railway cars, characterized by the following method steps:
   in a first method step, lowering the loading head by way of lifting gear onto a filling opening arranged at the railway car until a lower sealing ring, at the loading head, moves into the filling opening and sealingly conforms to a vertical flange of the filling opening, and becomes centered there;
   in a second method step, lowering the loading head further by way of the lifting gear until an upper second sealing ring rests on a horizontal flange of the filling opening and provides sealing there.

16. A method for operating a loading head arrangement, including a ventilation hood for ventilating railway cars to be loaded with pourable bulk materials, characterized by the following method steps:
   in a first method step, lowering the ventilation hood by way of lifting gear onto a ventilation opening arranged at the railway car until a lower sealing ring, at the ventilation hood, moves into the ventilation opening and sealingly conforms to a vertical flange of the ventilation opening, and becomes centered there; and
   in a second method step, lowering the loading head further by way of the lifting gear until an upper second sealing ring rests on a horizontal flange of the ventilation opening and provides sealing there.

* * * * *